(12) United States Patent
Tam et al.

(10) Patent No.: US 11,410,032 B2
(45) Date of Patent: Aug. 9, 2022

(54) WORD2VEC PROCESSING SYSTEM

(71) Applicant: DeGirum Corporation, Campbell, CA (US)

(72) Inventors: Kit S. Tam, Menlo Park, CA (US); Shashi Kiran Chilappagari, San Jose, CA (US)

(73) Assignee: DeGirum Corporation, Santa Clara, CA (US)

( * ) Notice: Subject to any disclaimer, the term of this patent is extended or adjusted under 35 U.S.C. 154(b) by 678 days.

(21) Appl. No.: 16/448,290

(22) Filed: Jun. 21, 2019

(65) Prior Publication Data

US 2019/0392315 A1    Dec. 26, 2019

Related U.S. Application Data

(60) Provisional application No. 62/688,857, filed on Jun. 22, 2018.

(51) Int. Cl.
| | |
|---|---|
| *G06F 17/16* | (2006.01) |
| *G06N 3/08* | (2006.01) |
| *G06F 16/31* | (2019.01) |
| G06F 40/30 | (2020.01) |

(52) U.S. Cl.
CPC .............. *G06N 3/08* (2013.01); *G06F 17/16* (2013.01); *G06F 16/31* (2019.01); *G06F 40/30* (2020.01)

(58) Field of Classification Search
CPC ........ G06F 17/00; G06F 17/16; G06F 16/313; G06F 16/317; G06F 16/335; G06F 16/337; G06F 16/3344; G06F 40/30; G06N 3/02; G06N 3/08; G06N 3/082
See application file for complete search history.

(56) References Cited

U.S. PATENT DOCUMENTS

| | | | | |
|---|---|---|---|---|
| 5,014,235 | A | * | 5/1991 | Morton ................... G06F 17/16 365/185.11 |
| 5,787,267 | A | * | 7/1998 | Leung ................. G06F 12/0862 711/E12.004 |
| 2019/0251103 | A1 | * | 8/2019 | Mizobuchi .......... G06F 16/3344 |
| 2019/0310855 | A1 | * | 10/2019 | Uliel ..................... G06F 9/3836 |

OTHER PUBLICATIONS

Trevor M. Simonton and Gita Alaghband, Efficient and Accurate Word2Vec Implementations in GPU and Shared-Memory Multicore Architectures, 2017, IEEE, pp. 1-7 (Year: 2017).*

* cited by examiner

*Primary Examiner* — Thang V Tran

(74) *Attorney, Agent, or Firm* — Bever, Hoffman & Harms, LLP

(57) ABSTRACT

A computer system for performing negative sampling, including a processor chip having a plurality of on-chip memory banks, a plurality of on-chip compute engines and a memory interface, wherein the on-chip memory banks include memory blocks that store corresponding sets of 'likely to be updated' word vectors, a memory block that stores a subset of 'less likely to be updated' word vectors and a noise sample cache that stores a subset of negative samples. An external memory is coupled to the memory interface, and stores a set of 'less likely to be updated' word vectors and a set of negative samples. The on-chip compute engines include a refresh thread, which accesses the set of negative samples in the external memory to provide the subset of negative samples stored in the noise sample cache on the processor chip, such that these negative samples can be readily accessed on the processor chip.

22 Claims, 11 Drawing Sheets

WORD2VEC PROCESSING SYSTEM

RELATED APPLICATION

This application claims priority from U.S. Provisional Patent Application 62/688,657, entitled "WORD2VEC PROCESSING SYSTEM", which was filed on Jun. 22, 2018, and is incorporated by reference herein.

FIELD OF THE INVENTION

The present invention relates to a system for implementing a neural network. More specifically, the present invention relates to a word2vec processing system and methods for implementing the same.

RELATED ART

The word2vec model is used to learn vector representations of words, which may be referred to as 'word vectors' or 'word embeddings'. The word2vec model learns word vectors using a shallow neural network. In this model, each word in a vocabulary is mapped to a set of floating point vectors (i.e., a word vector). Meaningful operations can be performed on these word vectors (e.g, Russia−Moscow+France=Paris). This model has many applications, including: translation, document classification, name entity recognition and sentiment analysis.

FIG. 1 illustrates a conventional single hidden layer feedforward neural network 100, which may be used to implement a word vector language model. From a group of words in a sentence of the corpus, a subset of the words in the group are selected as an input, and are provided to the input layer 101. The hidden layer 102 of neural network 100 is trained to predict the probability of other words in the group. The output layer 103 provides the predicted probability distribution of the vocabulary in response to the input word(s).

FIG. 2 is a block diagram 200 representative of a conventional continuous bag of words (CBOW) model. Given a context window 201 that includes the words "computer can beat chess champion", the model is trained to predict the word 'beat' from the input words: 'computer' 'can' 'chess' and 'champion'.

FIG. 3 is a block diagram 300 representative of a conventional skip-gram model. Given a context window 301 that includes the words "computer can beat chess champion", the model is trained to predict the words 'computer' 'can' 'chess' and 'champion' from the input word 'beat'.

FIG. 4 is a block diagram 400 illustrating the concept of word vectors in a conventional word2vec model. Each word in the corpus includes a corresponding word vector having a fixed number of weight values. For example, the word 'apple' has a corresponding word vector that includes 300 weight values $W_{APPLE0}$-$W_{APPLE299}$, and the word 'zero' has a corresponding word vector that includes 300 weight values $W_{ZERO0}$-$W_{ZERO299}$. The word vectors for all of the words in the corpus are used to form a matrix 401, which is used to implement the hidden layer 102 of the neural network 100. As described in more detail below, the text of the corpus is used to perform word vector training, thereby determining the weight values for each of the word vectors in the matrix 401.

Word vector training, as performed by a conventional back-propagation training algorithm, is very computation intensive, for the following reasons. First, the size of the training corpus can be very large (e.g., billions of words). Second, there is a requirement that the output vectors must be normalized with the SoftMax functions (i.e., the sum of all of the output values must be 1).

A 'negative sampling' method has been provided to drastically simplify the training of the word vector models. In general, the 'negative sampling' method takes an input word (e.g., 'beat') and a plurality of context words surrounding the input word (e.g., 'computer', 'can', 'chess' and 'champion') from a context window. An input word update vector is initially set to a zero value. Then, for each context word: (1) the dot product of the input word vector and the context word vector is calculated, (2) a positive weight update vector is calculated from the dot product (3) the context word vector is updated using the dot product, (4) the input word update vector is updated by adding the positive weight update vector, and (5) N negative samples are drawn from a noise sample table.

For each of the N negative samples drawn: (1) the dot product of the input word vector and the word vector of the negative sample is calculated, (2) a negative weight update vector is calculated from the dot product (3) the word vector of the negative sample is updated using the dot product, and (4) the input word update vector is updated by adding the negative weight update vector.

After all of the positive weight update vectors and all the negative weight update vectors have been added to the input word update vector, the input word vector is updated with the input word update vector.

The computation cost of the 'negative sampling' method includes: $C*(N+1)$ dot products and $3*C*(N+1)+1$ vector adds, wherein C is the number of context words in the context window and N is the number of negative samples drawn for each context word. Note that each dot product requires two vector read operations from memory, and each vector add operation requires two vector read operations and one vector write operation.

The 'negative sampling' method exhibits scaling potential for various reasons. For example, an infinite amount of task level parallelism may exist, because the training of each input word from the corpus is an independent thread. Moreover, there is very good data reference locality, because only a small percentage of the words in the vocabulary will be referred to most of the time.

Conversely, there are limitations inherent in the 'negative sampling' method. For example, drawing random negative samples is costly in terms of power and performance. In one implementation, a 100M entry table may be required to simulate the distribution of the vocabulary. Moreover, there is very poor locality, whereby each independent thread must independently access the noise sample memory, which will degrade the cache performance significantly. In addition, only one scalar word retrieved from the noise sample memory will be used, which wastes a lot of DRAM bandwidth and I/O power. In addition, complicated 'update atomicity' and 'multiple-writers' problems will need to be resolved if multiple independent update threads are used.

Update atomicity can be explained using the following example:

```
Thread 0:
for (i=0; i<300; i++){
x[i] = a[i] + b[i]
}
Thread 1:
for (i=0; i<300; i++){
y[i] = x[i] + b[i]
}
```

To maintain update atomicity (and provide a proper result), Thread 1 can either use all the old x[i] values that exist before Thread 0 updates the x[i] values, or Thread 1 can use all the new x[i] values that exist after Thread 0 updates the x[i] values. However, an incorrect result will be provided if Thread 1 uses some of the old x[i] values that exist before Thread 0 updates the x[i] values and some of the new x[i] values that exist after Thread 0 updates the x[i] values.

The multiple-writers problem can be explained using the following example:

```
Thread 0:
for (i=0; i<300; i++){
x[i] = x[i] + 1
}
Thread 1:
for (i=0; i<300; i++){
x[i] = x[i] + 2
}
```

In this example, the final value of x[i] should be x[i]+3. In order to get the correct result, either Thread 1 uses the results of x[i] from Thread 0, and adds 2; or Thread 0 uses the results of x[i] from Thread 1, and adds 1. If the results of Thread 0 and Thread 1 are not coordinated in one of these two manners, then an incorrect result may be provided for x[i] (e.g., the final value of x[i] could be x[i]+1 if the Thread 0 result prevails, without considering the result of Thread 1; or the final value of x[i] could be x[i]+2 if the Thread 1 result prevails, without considering the result of Thread 0.)

In general, negative sampling execution for word vector training is mostly performed using a graphics processing unit (GPU) and a conventional CPU. However, these processing units are not optimized to perform the required operations. More specifically, disadvantages associated with the GPU architecture include: (1) the on-chip memory is too small and fragmented to take advantage of vocabulary locality, (2) the GPU architecture lacks memory coherence support for handling the 'update atomicity' and 'multiple-writers' problems, and (3) the drawing of negative samples wastes a significant amount of DRAM bandwidth. Disadvantages associated with the CPU architecture include: (1) reliance on the cache-coherence and memory barriers to support 'update atomicity' and eliminate the 'multiple-writers' problem results in very low performance (2) the negative sampling trashes the cache hierarchies, wastes DRAM bandwidth and requires excessive cache updates and replacement, (3) performance is limited by the data cache bandwidth (2 load and 0.5 store per operation on average), and (4) there is no control of data movement (a word vector being updated could be kicked out from the cache).

It would therefore be desirable to have a scalable system architecture for efficiently performing negative sampling execution for word vector training.

SUMMARY

Accordingly, the present invention provides a scalable system architecture that includes one or more processor chips, each including a plurality of on-chip memory banks, a plurality of on-chip compute engines, and a memory interface that enables the processor chip to access an external memory.

In one embodiment, the on-chip memory banks are logically divided into a plurality of memory blocks that store corresponding sets of 'likely to be updated' word vectors, a memory block that stores 'less likely to be updated' word vectors and a noise sample cache. The external memory is configured to store 'less likely to be updated' word vectors and a noise sample table.

The compute engines include a noise sample cache refresh thread, which retrieves negative samples from the noise sample table, and stores these retrieved negative samples in the noise sample cache, such that these negative samples can be readily accessed on the processor chip.

The compute engines also include a plurality of update threads, wherein each of the update threads controls the updating of word vectors in a corresponding one of the memory blocks that stores 'likely to be updated' word vectors.

The compute engines also include an update thread that controls the updating of word vectors in the memory block that stores 'less likely to be updated' word vectors. In one embodiment, 'less likely to be updated' word vectors are retrieved from the external memory when required, and are stored in the on-chip memory block dedicated to storing the 'less likely to be updated' word vectors.

The compute engines also include a plurality of training threads, which perform computations required to initialize (train) the word vectors. The training threads obtain permission to access the required word vectors from the update threads. The update threads ensure that update atomicity of the word vectors is maintained, and prevent multiple writer errors from occurring during updates in the word vectors.

The present invention also provides an improved method for performing negative sampling operations using a processor chip and an external memory. In one embodiment, this method includes partitioning a plurality of word vectors into a 'likely to be updated' group of word vectors and a 'less likely to be updated' group of word vectors, based on a distribution of a plurality of words in a corpus. The 'likely to be updated' group of word vectors is stored in a plurality of memory blocks on the processor chip. The 'less likely to be updated' group of word vectors is stored in a first external memory block, external to the processor chip. A plurality of negative samples are stored in a second external memory block, external to the processor chip, wherein each of the negative samples specifies a word in the corpus. A refresh thread of the processing chip is used to retrieve subsets of the negative samples from the second external memory block, and store the retrieved negative samples in a noise sample cache on the processor chip. The negative samples are then retrieved from the noise sample cache to perform negative sampling operations on the processing chip.

In one embodiment, the method further includes receiving a training instruction with the processor chip, wherein the training instruction specifies an input word and a plurality of context words for a negative sampling operation. A training thread on the processor chip is then used to retrieve a plurality of negative samples from the noise sample cache for each of the plurality of context words. The training thread also obtains access rights to an input word vector associated with the input word, context word vectors associated with the context words, and negative sample word vectors associated with the negative samples, wherein the access rights are obtained from update threads on the processor chip. The training thread calculates dot products of the input word vector and each of the context word vectors. The training thread also calculates dot products of the input word vector and each of the negative sample word vectors. The training thread then generates an input word update vector using the calculated dot products.

The training thread then transmits a message to an update thread associated with the input word, indicating that the input word update vector is available. The update thread may then retrieve the input word update vector from the training thread, and update the input word vector using the input word update vector.

The training thread also transmits messages to update threads associated with the context words, wherein each message includes a dot product calculated using the input word vector and the corresponding context word vector. The update threads update the context word vectors associated with the context words using the dot products.

The training thread also transmits messages to update threads associated with the plurality of negative samples, wherein each message includes a dot product calculated using the input word vector and the corresponding negative sample word vector. The update threads update the negative sample word vectors associated with the plurality of negative samples using the dot products.

In accordance with one embodiment, a plurality of update threads are implemented on the processor chip, wherein each of the update threads is assigned control the updating of the 'likely to be updated' groups of word vectors stored in a corresponding one of the plurality of memory blocks on the processor chip. An update thread on the processor chip is also used to control updating of the 'less likely to be updated' group of word vectors stored in a memory block on the processor chip.

In accordance with another embodiment, the processor chip receives a training instruction that specifies an input word and a plurality of context words for a negative sampling operation. If the processor chip determines that a first context word vector associated with one of the plurality of context words is included in the 'less likely to be updated' group of word vectors, then the processor chip ignores the first context word vector in a subsequently performed negative sampling operation.

In accordance with another embodiment, the processor chip receives a training instruction that specifies an input word and a plurality of context words for a negative sampling operation. A training thread of the processor chip is used to retrieve a plurality of negative samples from the noise sample cache for each of the plurality of context words. If the processor chip determines that a first negative sample vector associated with one of the plurality of negative samples is included in the 'less likely to be updated' group of word vectors, then the processor chip ignores the first negative sample vector in a subsequently performed negative sampling operation.

The present invention will be more fully understood in view of the following description and drawings.

DETAILED DESCRIPTION

Figure 1:
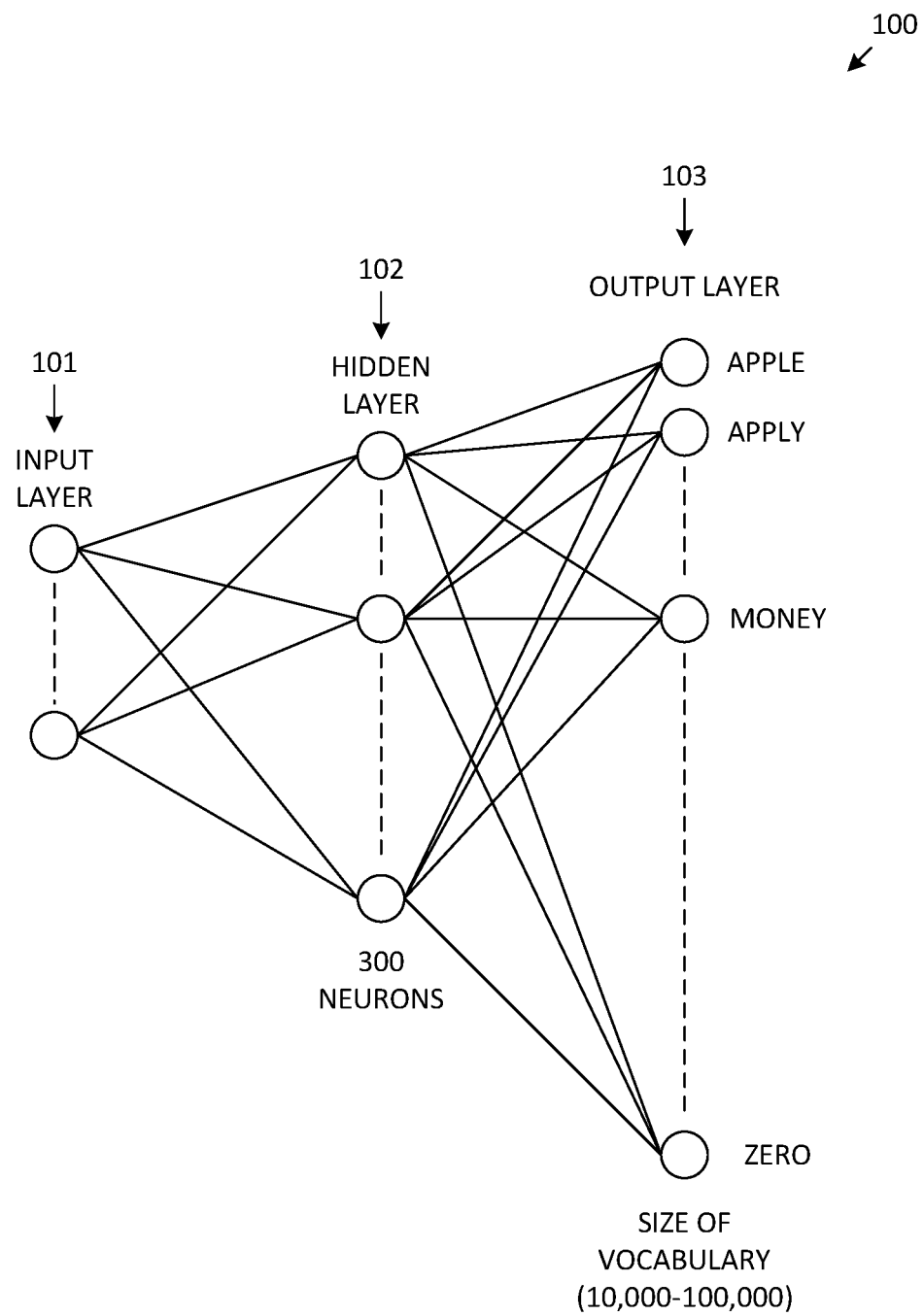
FIG. 1 is a block diagram illustrating a conventional single hidden layer feedforward neural network, which may be used to implement a word vector (word2vec) language model.
Figure 2:
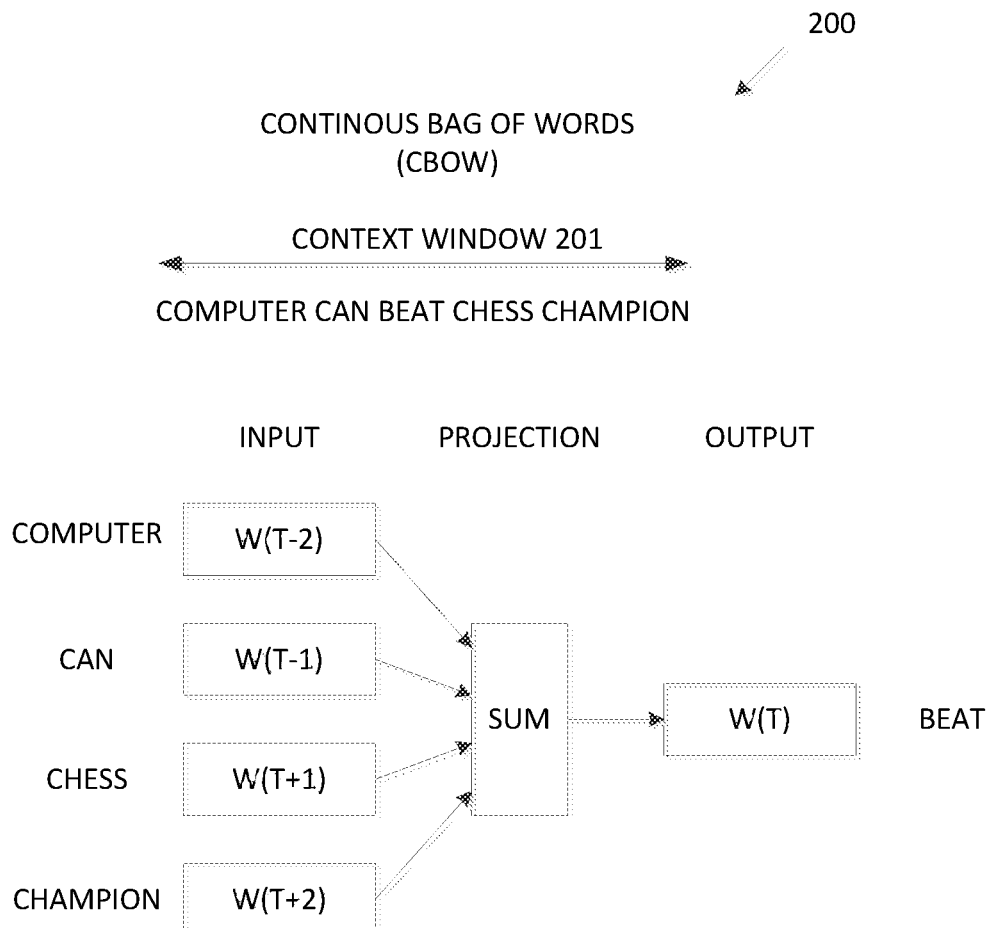
FIG. 2 is a block diagram representative of a conventional continuous bag of words (CBOW) model.
Figure 3:
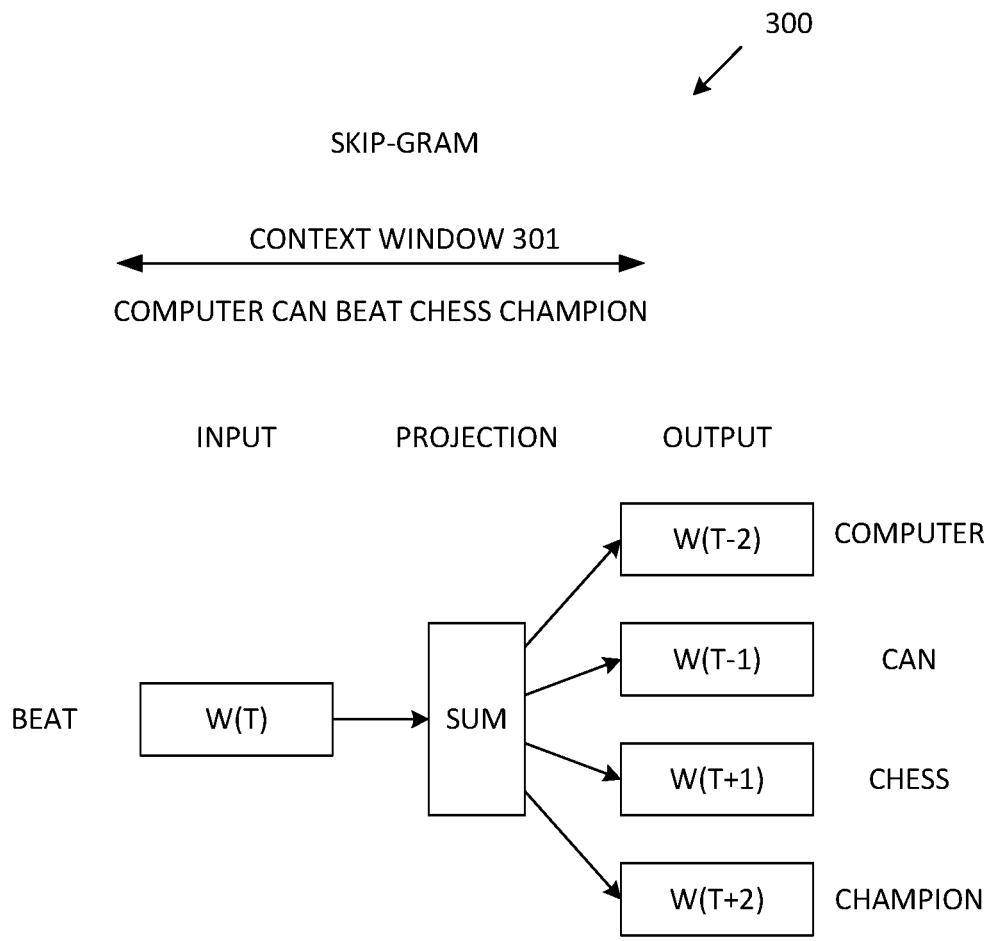
FIG. 3 is a block diagram representative of a conventional skip-gram model.
Figure 4:
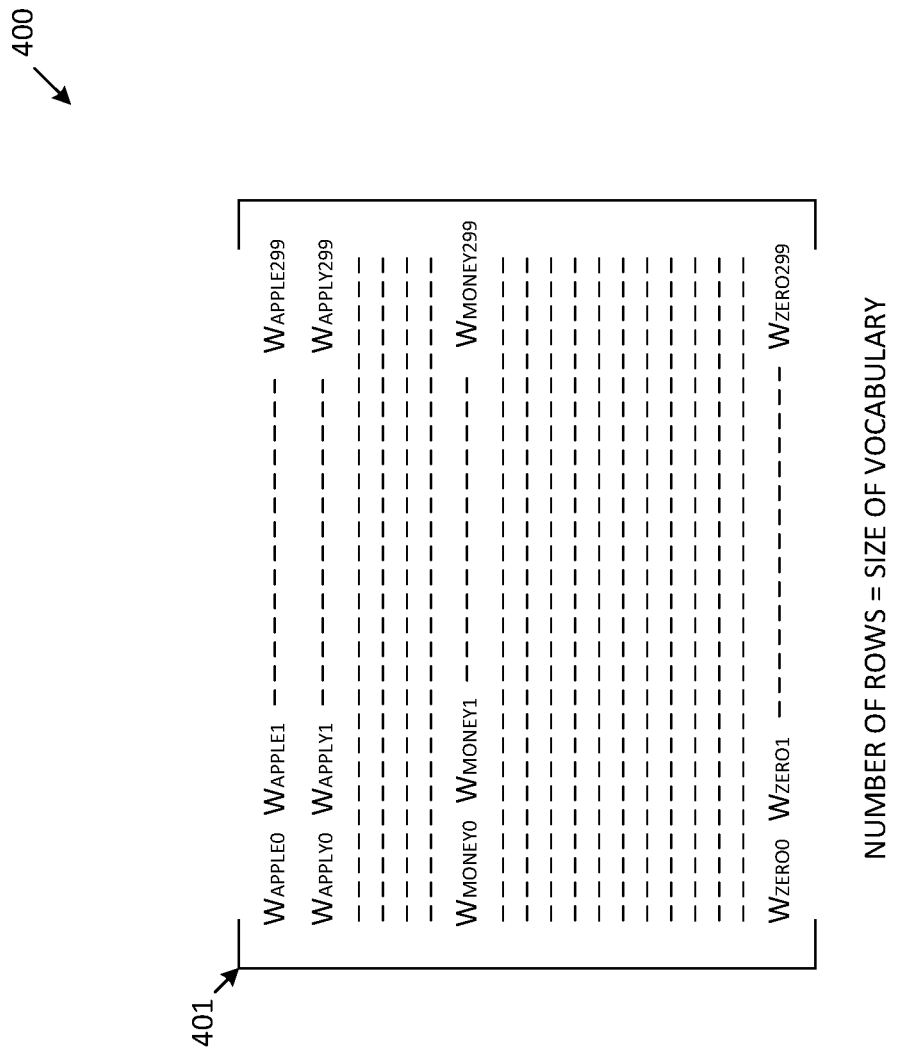
FIG. 4 is a block diagram illustrating the concept of word vectors in a conventional word2vec model.
Figure 5:
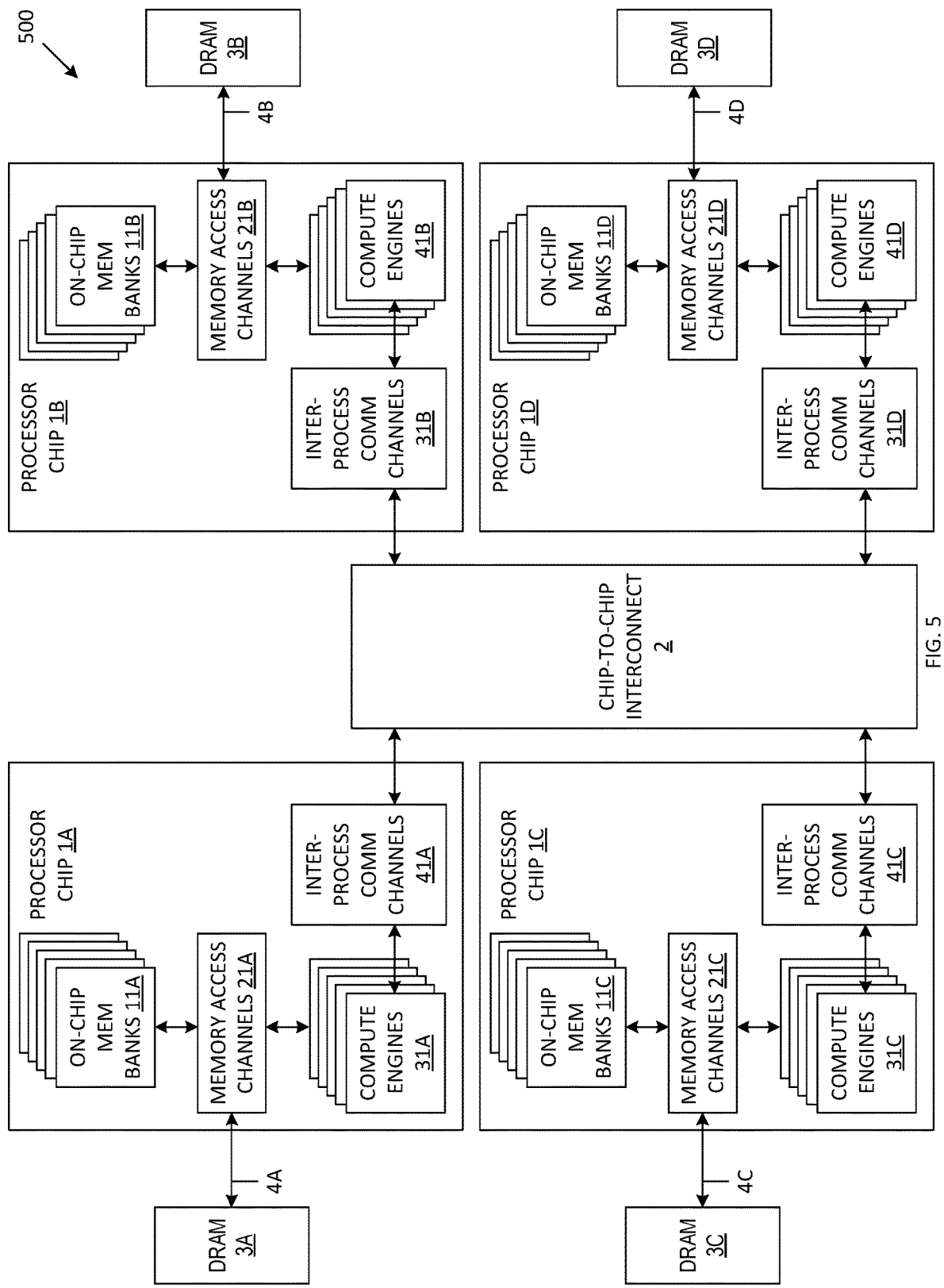
FIG. 5 is a block diagram of a word2vec system architecture in accordance with one embodiment of the present invention.

FIG. 5 is a block diagram of a word2vec system architecture 500 in accordance with one embodiment of the present invention. The system architecture 500 is made up of one or more processor chips. The illustrated system architecture 500 includes four processor chips 1A, 1B, 1C and 1D. However, in other embodiments, other numbers of processor chips can be used. Each of the processor chips 1A, 1B, 1C and 1D is connected to a corresponding industry standard DRAM 3A, 3B, 3C and 3D, respectively, via a corresponding DRAM interface 4A, 4B, 4C and 4D, respectively. For systems that include multiple processor chips, each of these processor chips is connected to a chip-to-chip interconnect structure 2. Thus, each of the processor chips 1A-1D is connected to the chip-to-chip interconnect structure 2, wherein the chip-to-chip interconnect structure facilitates communicate between the processor chips 1A-1D via the exchange of messages. Each of the processor chips 1A-1D can access each of the DRAMs 3A-3D via the chip-to-chip interconnect structure 2.

Each of the processor chips 1A, 1B, 1C and 1D includes a corresponding on-chip memory bank set 11A, 11B, 11C and 11D, respectively, and a corresponding compute engine set 31A, 31B, 31C and 31D, respectively. In one embodiment, each of the on-chip memory bank sets 11A, 11B, 11C and 11D includes a plurality of memory banks, and has a total storage capacity of about 32-256 MB, and a total bandwidth that is about 1 to 2 orders of magnitude higher than the bandwidth of the corresponding DRAMs 3A, 3B, 3C and 3D. In one embodiment, each of the on-chip memory bank sets 11A-11D includes four or more static random access memory (SRAM) banks.

The each of compute engine sets 31A-31D includes a plurality of multi-threaded programmable compute engines. In one embodiment, each of the compute engine sets 31A-31D includes four or more multi-threaded programmable compute engines. Each of these compute engines can execute a set of programming threads to perform computations and memory accesses for their assigned functions. Each of these program threads can access any of the corresponding on-chip memory banks and the corresponding DRAM via an on-chip memory access channel. More specifically, the compute engine sets 31A, 31B, 31C and 31D can access their corresponding on-chip memory bank sets 11A, 11B, 11C and 11D, respectively, and their corresponding DRAMs 3A, 3B, 3C and 3D, respectively, via on-chip memory access channels 21A, 21B, 21C and 21D, respectively.

Each of the processor chips 1A, 1B, 1C and 1D also includes a corresponding inter-process communication channel 41A, 41B, 41C and 41D, respectively. Inter-process communication channels 41A, 41B, 41C and 41D couple the compute engine sets 31A, 31B, 31C and 31D, respectively, to the chip-to-chip interconnect structure 2. As a result, each of the program threads of compute engine sets 31A, 31B, 31C and 31D can communicate with one other via messages that are transmitted through the inter-process communication channels 41A, 41B, 41C and 41D, and the chip-to-chip interconnect structure 2.

Figure 6:
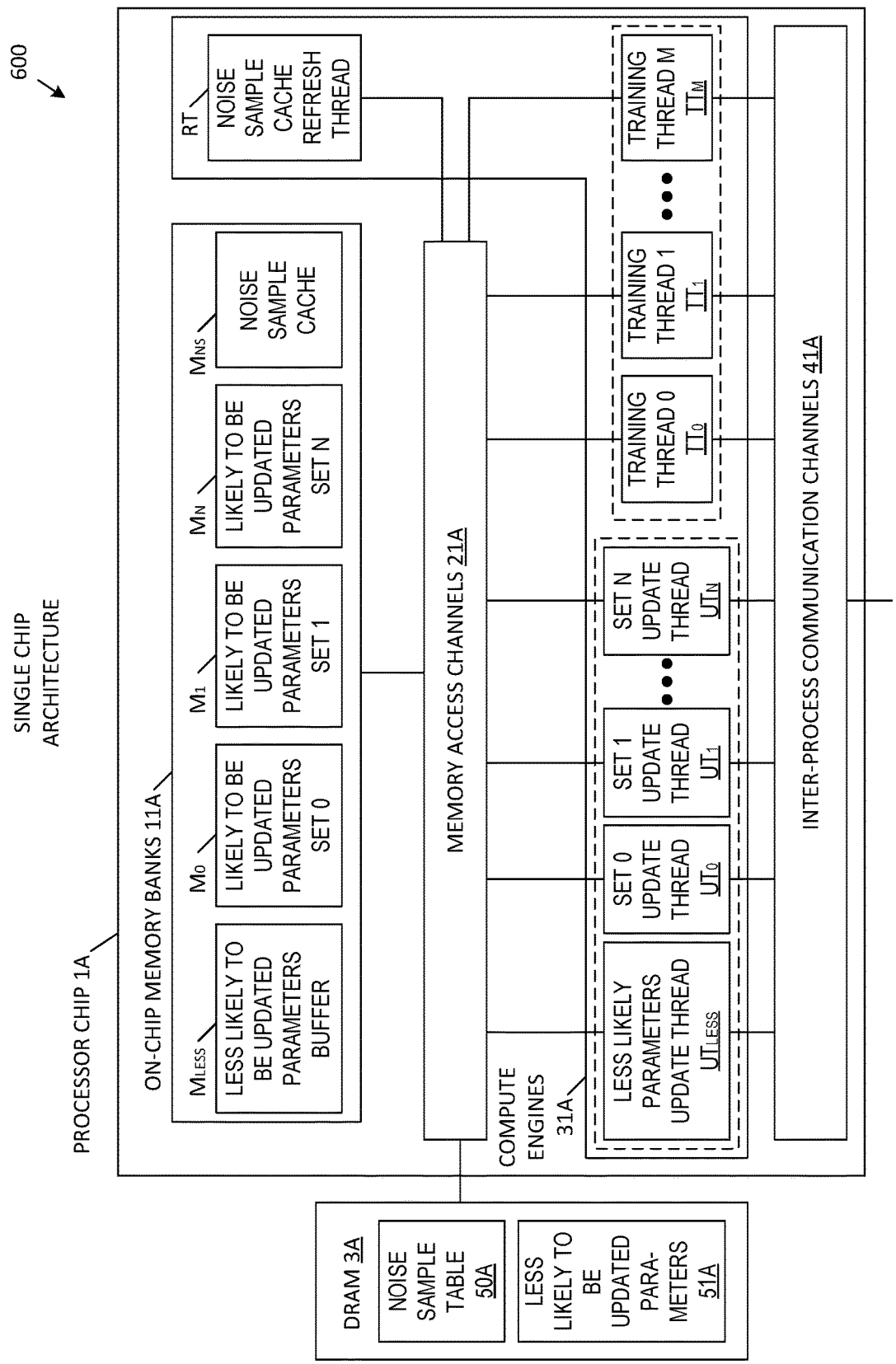
FIG. 6 is a block diagram illustrating a processor chip and DRAM of the word2vec system architecture of FIG. 5 in more detail, in accordance with one embodiment of the present invention.
Figure 7:
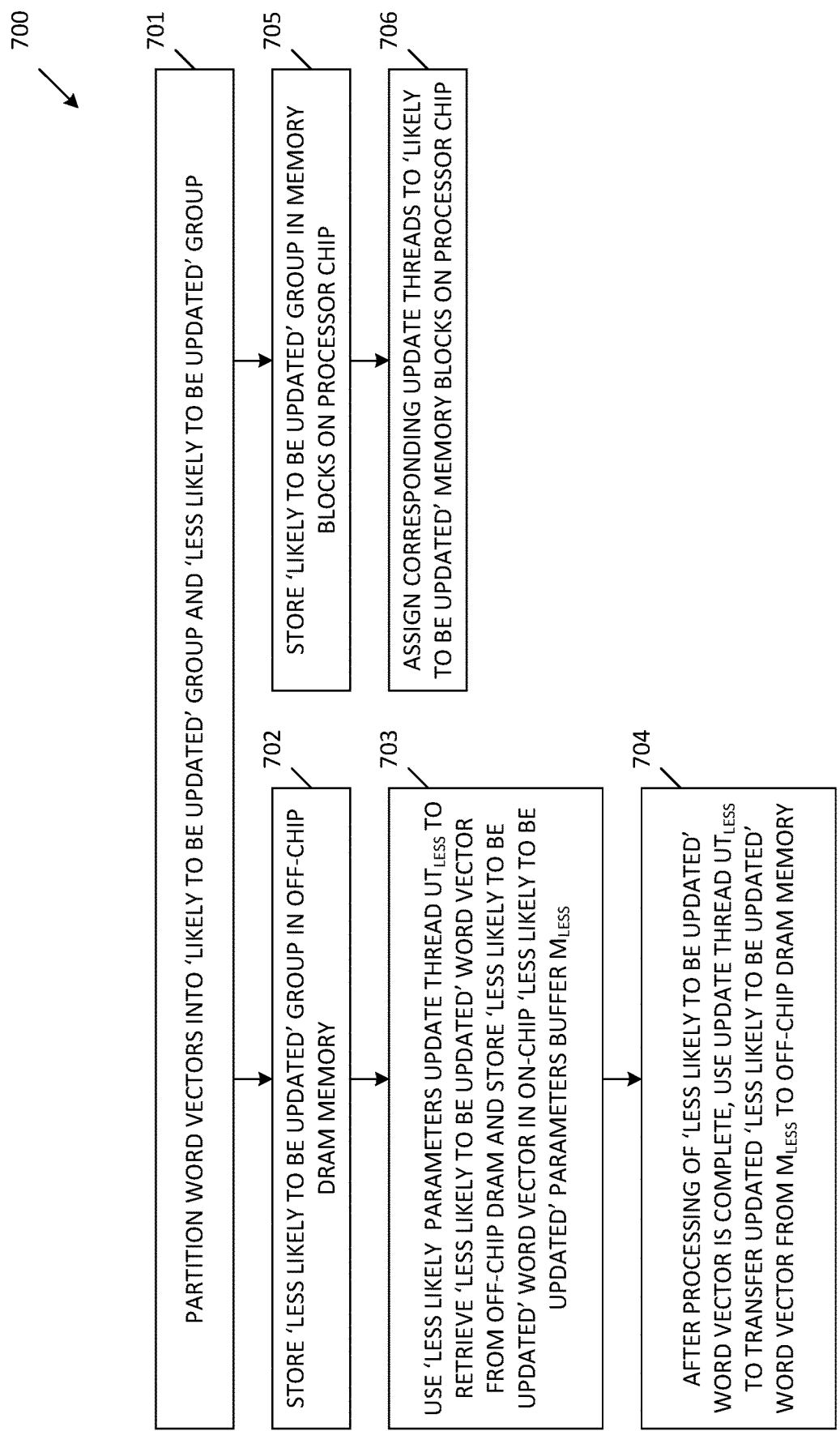
FIG. 7 is a block diagram illustrating a method for processing word vectors of a corpus in accordance with one embodiment of the present invention.

FIG. 6 is a block diagram illustrating the processor chip 1A and DRAM 3A of FIG. 5 in more detail, in accordance with one embodiment of the present invention. As will become apparent in view of the following description, processor chip 1A may be the only processor chip required to implement a word2vec processor system 600. Alternately, processor chip 1A can be used in combination with the other above-described processor chips 1B, 1C and 1D to implement a word2vec processor system (FIG. 7). As illustrated by FIG. 6, DRAM 3A is partitioned to include a memory block 50A that stores a noise sample table and a memory block 51A that stores 'less likely to be updated' parameters (e.g., less likely to be updated word vectors).

As illustrated by FIG. 6, on-chip memory banks 11A include a plurality of memory blocks, including N+1 memory blocks $M_0$-$M_N$, which are used to store corresponding sets of 'likely to be updated' parameters (e.g., likely to be updated word vectors), a memory block $M_{LESS}$, which is used to store (cache) 'less likely to be updated' parameters (e.g., less likely to be updated word vectors), and a memory block $M_{NS}$, which is used to store (cache) negative sample values used for negative sampling.

As also illustrated by FIG. 6, on-chip compute engines 31A are used to implement a plurality of processing threads, including: N+1 update threads $UT_0$-$UT_N$, which are used to update the 'likely to be updated' parameters of memory blocks $M_0$-$M_N$, respectively; update thread $UT_{LESS}$, which is used to update the 'less likely to be updated' parameters of memory block $M_{LESS}$; M+1 training threads $TT_0$-$TT_M$, which are used to perform negative sampling operations based on negative samples stored in the noise sample cache $M_{NS}$; and noise sample cache refresh thread RT, which is used to load new negative samples into noise sample cache $M_{NS}$ (from the 'less likely to be updated" parameter set 51A stored in DRAM 3A).

FIG. 7 is a block diagram 700 illustrating a method for processing the word vectors of the corpus in accordance with one embodiment. In this embodiment, word vectors to be processed are partitioned into two groups based on the distribution of the words within the corpus, including 'likely to be updated' word vectors and 'less likely to be updated' word vectors (FIG. 7, Step 701). These groups can be selected based on the number of times the corresponding words appear in the corpus (i.e., word vectors for words that appear in the corpus the largest number of times are included in the 'likely to be updated' word vector group). The boundary of the partition is determined by the memory capacity of the on-chip memory banks 11A. That is, the larger the memory capacity of the on-chip memory banks 11A, the more word vectors can be included in the 'likely to be updated' word vector group.

As illustrated by FIGS. 6 and 7, the 'less likely to be updated' word vectors are stored in a partition 51A of the corresponding DRAM 3A (FIG. 7, Step 702). When a 'less likely to be updated' word vector is to be processed, the less likely parameters update thread $UT_{LESS}$ (implemented by the compute engines 31A) causes the 'less likely to be updated' word vector to be retrieved from DRAM partition 51A, and be stored in on-chip 'less likely to be updated' parameters buffer $M_{LESS}$ (FIG. 7, Step 703). When processing of the 'less likely to be updated' word vector is complete, the update thread $UT_{LESS}$ causes the updated 'less likely to be updated' word vector to be transferred from the buffer $M_{LESS}$ back to the partition 51A of DRAM 3A (FIG. 7, Step 704).

As illustrated by FIGS. 6 and 7, the 'likely to be updated' word vectors are stored in on-chip memory banks 11A. The 'likely to be updated' word vectors are partitioned into N+1 sets, wherein each set is stored in a corresponding one of N+1 memory blocks $M_0$, $M_1$, ... $M_N$. Thus, sets 0, 1, ..., N of 'likely to be updated' word vectors are stored in memory blocks $M_0$, $M_1$, ... $M_N$, respectively (FIG. 7, Step 705). Each set of 'likely to be updated' word vectors is assigned a dedicated update thread (implemented by the compute engines 31A), which performs updates on these word vectors (FIG. 7, Step 706). More specifically, update threads $UT_0$, $UT_1$, ..., $UT_N$ are assigned responsibility for updating the sets of word vectors stored by memory blocks $M_0$, $M_1$, ... $M_N$, respectively. As described in more detail below, the update threads perform read-modify-write operations on various word vectors. As also described in more detail below, each of the update threads $UT_0$, $UT_1$, ..., $UT_N$ is responsible for granting access rights to the word vectors stored in its corresponding memory block $M_0$, $M_1$, ... $M_N$, respectively.

More specifically, each of the update threads is responsible for granting access rights for its associated word vectors to training threads $TT_0$, $TT_1$, ..., $TT_M$ (included within the compute engines 31A). As described in more detail below, the training threads are provisioned to perform 'negative sampling' executions. The results of these negative sampling executions are used to update the various word vectors. The ratio of the number of training threads (M+1) to the number of update threads (N+1) is an implementation choice, selected to optimize the throughput of the negative sampling executions.

Each of the update threads $UT_0$, $UT_1$, ..., $UT_N$ is responsible for updating the word vectors in its corresponding memory block $M_0$, $M_1$, ... $M_N$, respectively, based on the negative sampling executions performed by the training threads $TT_0$, $TT_1$, ... $TT_M$.

An update thread will not grant access rights for a word vector to a training thread while the word vector is being updated. As a result, update atomicity is upheld. Note that it is possible for an update thread to grant access rights for a particular word vector to different training threads. In this case, however, the update for that particular word vector can only be performed after every training thread has relinquished its access rights to the word vector. In accordance with one embodiment, an update thread can limit the number of access rights that can be granted for a word vector in order to limit the buffer space required for storing the update information, and also to maintain the accuracy of the computations.

In addition, an update thread is the only process that can update its corresponding word vectors. As a result, the multiple-writers problem does not exist. As described in more detail below, an update thread can merge multiple updates of a single word vector for performance optimization.

Figure 8:
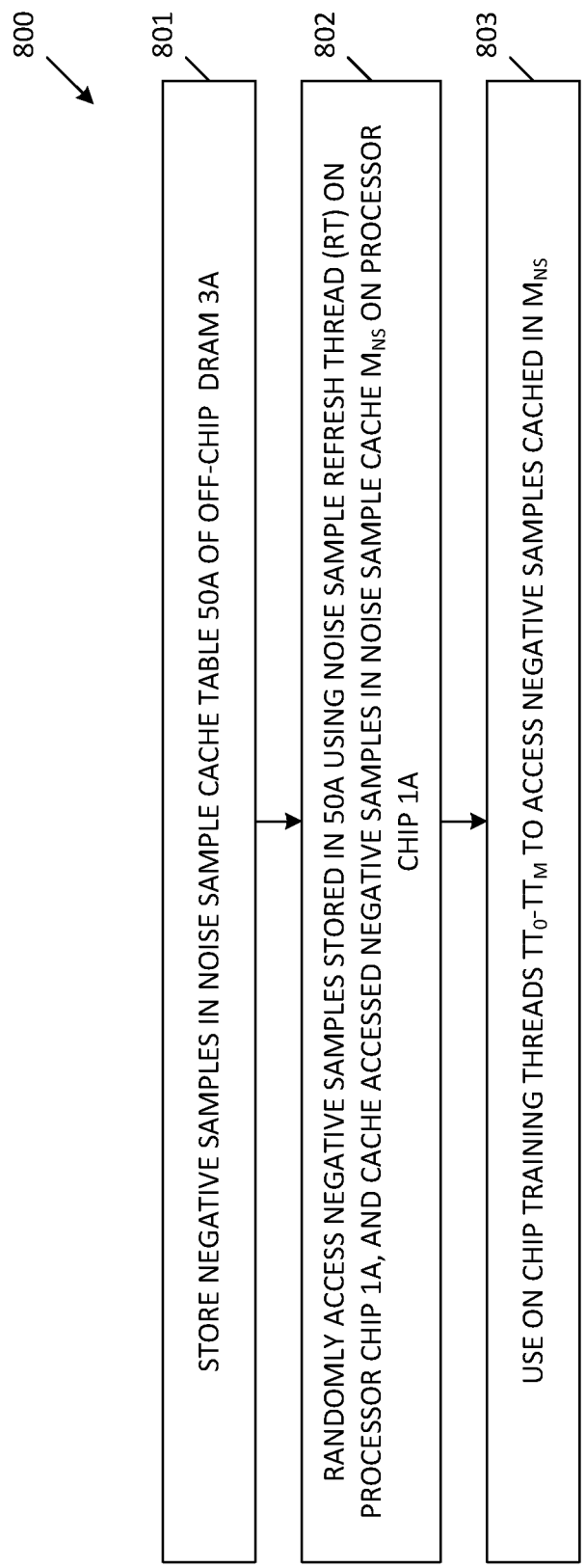
FIG. 8 is a block diagram illustrating a method for storing and using negative samples in accordance with one embodiment of the present invention.

FIG. 8 is a block diagram 800 illustrating a method for storing and using negative samples in accordance with one embodiment of the present invention. As illustrated by FIG. 6, a portion of the on-chip memory 11A is allocated to implement a noise sample cache memory $M_{NS}$. The noise sample cache memory $M_{NS}$ will cache a portion of the noise sample table 50A stored in the DRAM 3A. Note that the noise sample table 50A stores values corresponding with all of the words of the corpus at random addresses. In one embodiment, the noise sample table 50A stores words of the corpus in accordance with their frequency of appearance within the corpus (i.e., more common words are replicated more times in noise sample table 50A) (FIG. 8, Step 801). A noise sample cache refresh thread RT is implemented to constantly refresh the noise sample cache $M_{NS}$ at the allocated bandwidth of the DRAM interface 4A, using randomly generated addresses (FIG. 8, Step 802). The noise sample refresh operation is accomplished by randomly replacing the entries of the noise sample cache $M_{NS}$ with the data (negative samples) fetched by the noise sample cache refresh thread RT. As described in more detail below, the training threads $TT_0$-$TT_M$ draw negative samples from the noise sample cache $M_{NS}$ (FIG. 8, Step 803), so no DRAM bandwidth is consumed by the training threads $TT_0$-$TT_M$ accessing negative samples.

Figure 9:
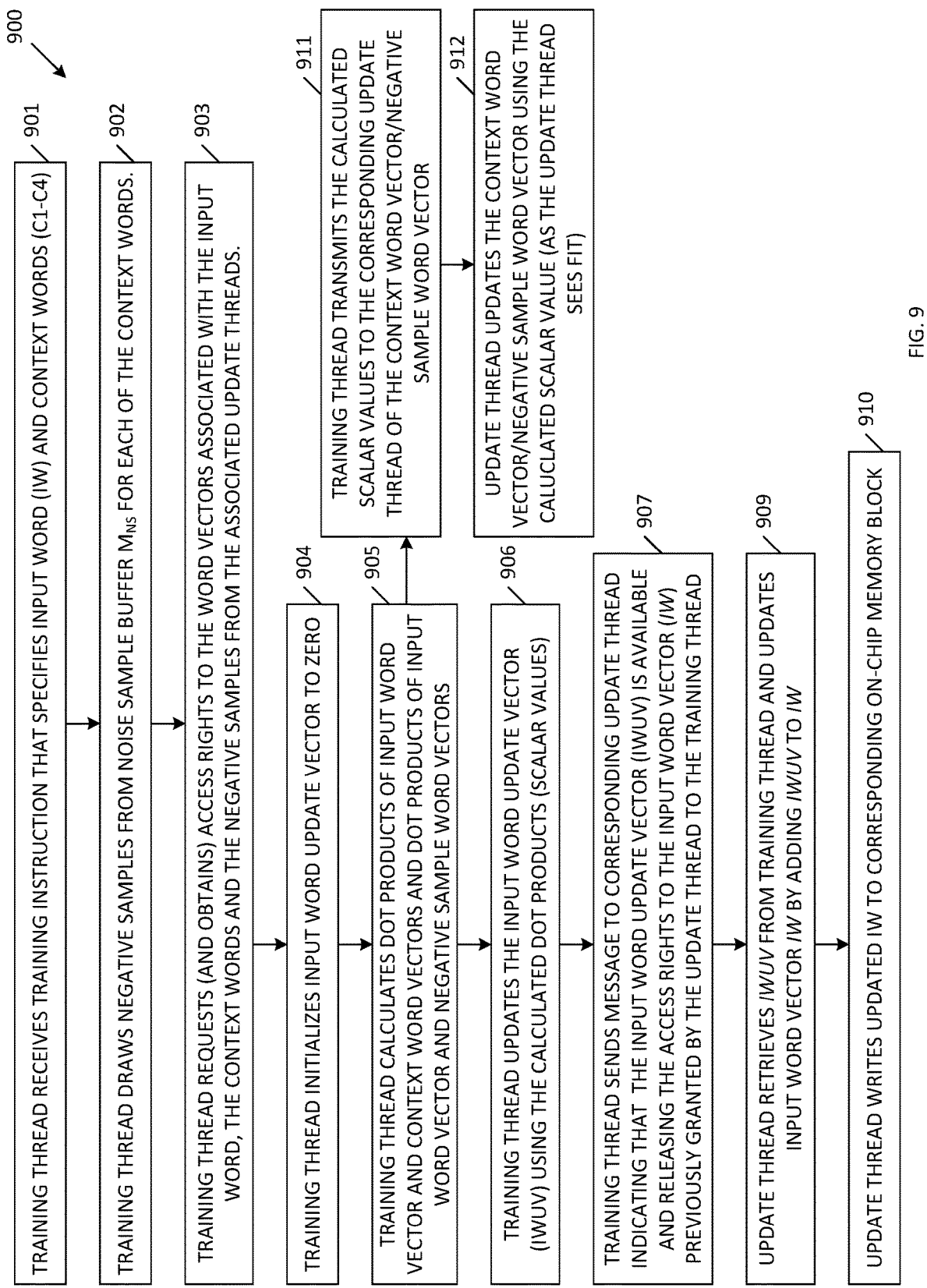
FIG. 9 is a block diagram illustrating a training operation using negative sampling in accordance with one embodiment of the present invention.

A training operation will now be described, using a particular example. FIG. 9 is a block diagram illustrating the training operation of the present example. To perform a training operation based on an input word (IW) and four corresponding context words ($C_1$, $C_2$, $C_3$ and $C_4$) (e.g., using a skip-gram model), an instruction is sent to one of the training threads ($TT_0$, $TT_1$, ..., $TT_M$), along with the input word and the corresponding context words (FIG. 9, Step 901). Although four context words are provided in the described example, it is understood that other numbers of context words can be provided in other embodiments. In the present example, the instruction, input word and corresponding context words are transmitted from an external system processor (not shown) to via inter-process communication channels 41A (which, in turn, transmits this information to training thread $TT_0$).

In response to the received instruction, the training thread $TT_0$ begins the training operation by drawing negative samples from noise sample buffer $M_{NS}$ for each of the context words (FIG. 9, Step 902). For example, the training thread $TT_0$ may draw negative samples $N_{11}$, $N_{12}$, $N_{13}$, $N_{14}$ and $N_{15}$ for context word $C_1$, negative samples $N_{21}$, $N_{22}$, $N_{23}$, $N_{24}$ and $N_{25}$ for context word $C_2$, negative samples $N_{31}$, $N_{32}$, $N_{33}$, $N_{34}$ and $N_{35}$ for context word $C_3$, and negative samples $N_{41}$, $N_{42}$, $N_{43}$, $N_{44}$ and $N_{45}$ for context word $C_4$. Although five negative samples are drawn for each context word in the described example, it is understood that other numbers of negative samples can be drawn for each context word in other embodiments.

The training thread $TT_0$ requests access rights to the word vector associated with the input word IW from the update thread that 'owns' the input word vector (IW) (e.g., the update thread that manages the input word vector) (FIG. 9, Step 903). For example, if the input word vector IW is stored in the 'likely to be updated' parameters set 0 memory block $M_0$, then the training thread $TT_0$ requests access rights to the input word vector IW from the corresponding parameter set 0 update thread $UT_0$.

The training thread $TT_0$ also requests access rights to the word vectors associated with the context words $C_1$, $C_2$, $C_3$ and $C_4$ and the word vectors associated with the negative samples $N_{11}$-$N_{15}$, $N_{21}$-$N_{25}$, $N_{31}$-$N_{35}$ and $N_{41}$-$N_{45}$, from the update threads that 'own' these context words vectors ($C_1$, $C_2$, $C_3$ and $C_4$) and negative sample word vectors ($N_{11}$-$N_{15}$, $N_{21}$-$N_{25}$, $N_{31}$-$N_{35}$ and $N_{41}$-$N_{45}$) (FIG. 9, Step 903).

The training thread $TT_0$ allocates buffer space (i.e., memory space included within the compute engine that implements the training thread $TT_0$) to store the input word update vector to be calculated, and initializes the input word update vector to zero (FIG. 9, Step 904). The training thread $TT_0$ also allocates buffer space to store update information (i.e., a scalar value) associated with the context word vectors and negative sample word vectors.

Upon receiving the access rights to the input word vector and at least one of the context word vectors or negative sample word vectors, the training thread $TT_0$ retrieves the input word vector and the context word vector/negative sample word vector, and calculates the dot product of the input word vector and the context word vector/negative sample word vector, thereby generating a scalar value that is used to update the input word vector and the context word vector/negative sample word vector (FIG. 9, Step 905). Note that access rights to all of the context word vectors and noise word vectors may not be obtained immediately, so that there may be some wait period necessary to complete the all of the dot products. However, the following dot products are all eventually calculated by the training thread $TT_0$ in the present example.

$IW \cdot C_1 = scalar_1$
$IW \cdot C_2 = scalar_2$
$IW \cdot C_3 = scalar_3$
$IW \cdot C_4 = scalar_4$
$IW \cdot N_{11} = scalar_{11}$   $IW \cdot N_{21} = scalar_{21}$
$IW \cdot N_{12} = scalar_{12}$   $IW \cdot N_{22} = scalar_{22}$
$IW \cdot N_{13} = scalar_{13}$   $IW \cdot N_{23} = scalar_{23}$
$IW \cdot N_{14} = scalar_{14}$   $IW \cdot N_{24} = scalar_{24}$
$IW \cdot N_{15} = scalar_{15}$   $IW \cdot N_{25} = scalar_{25}$
$IW \cdot N_{31} = scalar_{31}$   $IW \cdot N_{41} = scalar_{41}$
$IW \cdot N_{32} = scalar_{32}$   $IW \cdot N_{42} = scalar_{42}$
$IW \cdot N_{33} = scalar_{33}$   $IW \cdot N_{43} = scalar_{43}$
$IW \cdot N_{34} = scalar_{34}$   $IW \cdot N_{44} = scalar_{44}$
$IW \cdot N_{35} = scalar_{35}$   $IW \cdot N_{45} = scalar_{45}$ Upon calculating each of the scalar values set forth above, the training thread $TT_0$ performs the following actions.

The training thread $TT_0$ updates the input word update vector IWUV using the calculated scalar values (FIG. 9, Step 906). For example, after calculating the scalar value, $scalar_1$, an update vector is calculated by multiplying the context word vector $C_1$ by the calculated scalar value, $scalar_1$. The input word update vector IWUV is updated by adding this calculated update vector to the current input word update vector. Note that update vectors determined based on the context word vectors $C_1$-$C_4$ are added to the input word update vector IWUV, while update vectors determined based on the noise word vectors $N_{11}$-$N_{15}$, $N_{21}$-$N_{25}$, $N_{31}$-$N_{35}$ and $N_{41}$-$N_{45}$ are subtracted from the input word update vector IWUV. Thus, the input word update vector (IWUV) is determined as follows:

$IWUV = C_1 \times scalar_1 + C_2 \times scalar_2 + C_3 \times scalar_3 + C_4 \times scalar_4 - N_{11} \times scalar_{11} - N_{12} \times scalar_{12} - N_{13} \times scalar_{13} - N_{14} \times scalar_{14} - N_{15} \times scalar_{15} - N_{21} \times scalar_{21} - N_{22} \times scalar_{22} - N_{23} \times scalar_{23} - N_{24} \times scalar_{24} - N_{25} \times scalar_{25} - N_{31} \times scalar_{31} - N_{32} \times scalar_{32} - N_{33} \times scalar_{33} - N_{34} \times scalar_{34} - N_{35} \times scalar_{35} - N_{41} \times scalar_{41} - N_{42} \times scalar_{42} - N_{43} \times scalar_{43} - N_{44} \times scalar_{44} - N_{45} \times scalar_{45}$ As described above, the input word update vector IWUV is stored in a memory buffer within the training tread $TT_0$. Note that all of the scalars: $scalar_1$-$scalar_4$, $scalar_{11}$-$scalar_{15}$, $scalar_{21}$-$scalar_{25}$, $scalar_{31}$-$scalar_{35}$ and $scalar_{41}$-$scalar_{45}$ must be calculated before the input word update vector IWUV can be completely updated. When the input word update vector IWUV has been calculated, the training thread $TT_0$ transmits a message to the corresponding update thread $UT_0$, informing the update thread $UT_0$ that the input word update vector IWUV is available, and releasing the access rights to the input word vector that were previously granted by the update thread $UT_0$ to the training thread $TT_0$ (FIG. 9, Step 907). When the update thread $UT_0$ determines that it is time to update the input word vector IW, the update thread $UT_0$ retrieves the input word update vector IWUV from the buffer of the training thread $TT_0$, and then adds the input word update vector IWUV to the input word vector IW (FIG. 9, Step 908). Note that the update thread $UT_0$ may also complete other updates to the input word vector IW at this time, based on other previously granted access rights. The update thread $UT_0$ then writes the updated input word vector to the corresponding 'likely to be updated' parameter set 0 memory block $M_0$ (FIG. 9, Step 909). The training thread $TT_0$ releases the buffer space allocated to the input word update vector IWUV after the update thread $UT_0$ retrieves the input word update vector IWUV.

After a scalar value has been used to update the input word update vector IWUV in the manner described above, the training thread $TT_0$ transmits the calculated scalar value to the update thread of the corresponding context word vector/negative sample word vector, allowing the update thread to update the context word vector/negative sample word vector as the update thread sees fit (i.e., the timing of the update of the context word vector/negative sample word vector is controlled/determined by the update thread) (FIG. 9, Step 910). For example, upon calculating the scalar value $scalar_1$ associated with context word vector $C_1$, training thread $TT_0$ transmits the scalar value, $scalar_1$, to the update thread that 'owns' the context word vector $C_1$. This effectively ends the access rights that the training thread $TT_0$ was granted for the context word vector $C_1$. Assume that the update thread for parameter set 1 ($UT_1$) 'owns' the context word vector $C_1$. This update thread $UT_1$ stores the received scalar value, $scalar_1$, and determines when to update the context word vector $C_1$ (i.e., by multiplying the context word vector $C_1$ by the scalar value, $scalar_1$). Note that the update thread $UT_1$ may grant access rights to the context word vector $C_1$ to multiple training threads at the same time. For example, the update thread $UT_1$ may grant access rights to the context word vector $C_1$ to up to five training threads simultaneously. Upon receiving the corresponding scalar values from each of the (up to 5) training thread(s) that have been granted access rights to the context word vector $C_1$, the update thread $UT_1$ can complete the update of the context word vector $C_1$. (FIG. 9, Step 911). Upon completing the update of the context word vector $C_1$, the update thread $UT_1$ will write the updated context word vector to the corresponding memory (e.g., 'likely to be updated' parameter set 1 memory block $M_1$). In this manner, the update thread $UT_1$ eliminates any 'multiple writer' problems for context word vector $C_1$. After the context word vector $C_1$ has been updated, the update thread $UT_1$ can grant (up to 5) new access rights to the context word vector $C_1$.

In the foregoing manner, multiple negative training operations may be simultaneously and independently performed by the processor chip 1A, greatly improving the processing throughput of the computing resources used to perform the negative training operations.

Figure 10:
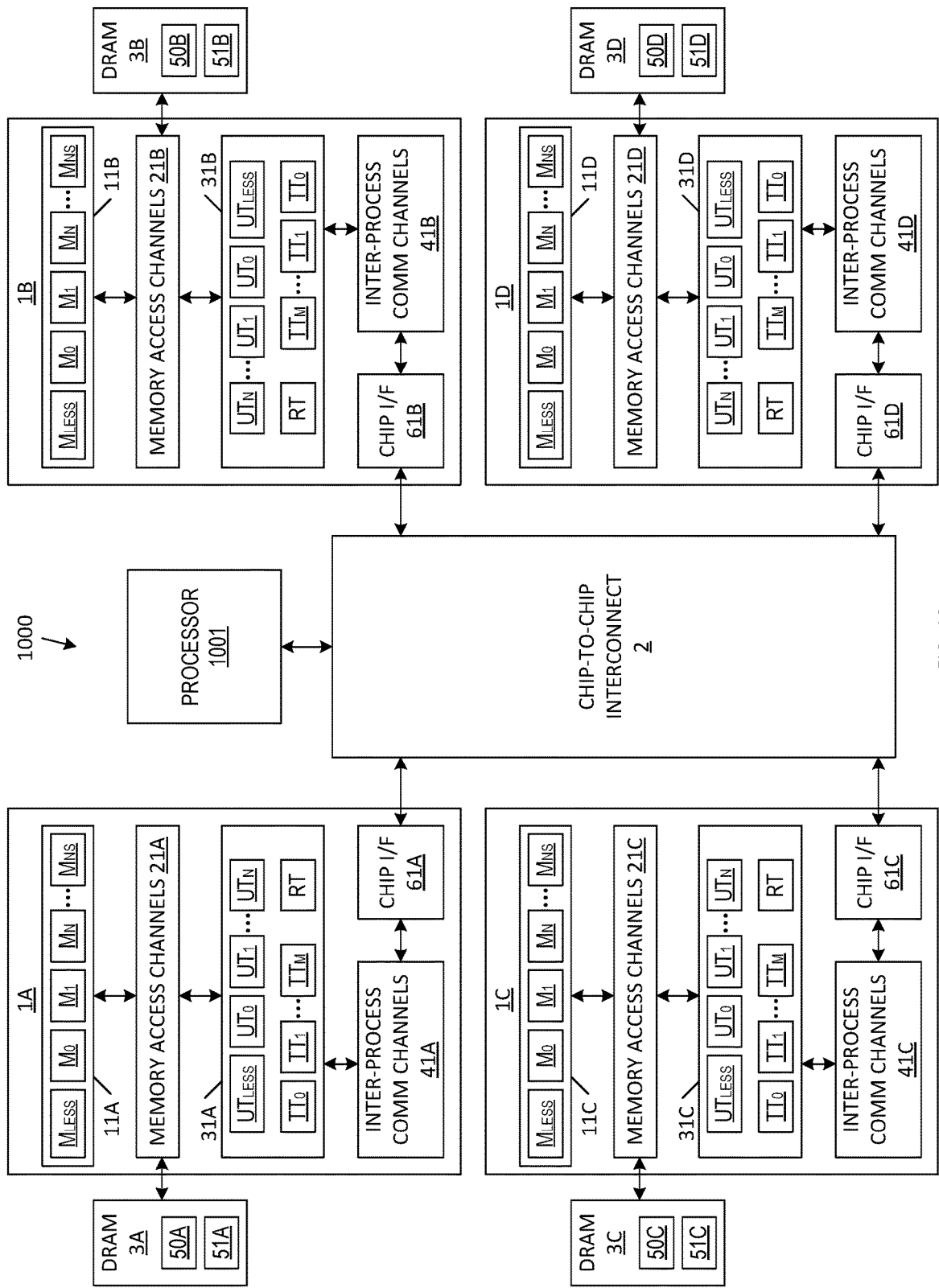
FIG. 10 is a block diagram of a multi-chip word2vec system architecture in accordance with another embodiment of the present invention.

FIG. 10 is a block diagram of a multi-chip word2vec system architecture 1000 in accordance with an alternate embodiment of the present invention. The system architecture 1000 implements multi-chip scaling, wherein multiple processor chips (i.e., processor chips 1A-1D of FIG. 5) and multiple DRAMs (i.e., DRAMs 3A-3D of FIG. 5) are configured to expand the system architecture of FIG. 6. In the embodiment illustrated by FIG. 10, each of the processor chips 1B, 1C and 1D is configured in substantially the same manner that processor chip 1A is configured in FIG. 6. Thus, each of the memory bank sets 11A-11D of processor chips 1A-1D is configured to implement memory blocks $M_{LESS}$, $M_0$-$M_N$ and $M_{NS}$ in the manner described above in connection with FIG. 6. Similarly, each of the compute engine sets 31A-31D of processor chips 1A-1D is configured to implement update threads $UT_{LESS}$ and $UT_0$-$UT_N$, training threads $TT_0$-$TT_M$ and refresh thread RT in the manner described above in connection with FIG. 6.

Similarly, in the embodiment illustrated by FIG. 10, each of the DRAMs 3B, 3C and 3D is configured in substantially the same manner that DRAM 3A is configured in FIG. 6. Thus, each of the DRAMs 3A, 3B, 3C and 3D is configured to implement a corresponding memory block 50A, 50B, 50C and 50D, respectively, for storing negative samples, and a corresponding memory block 51A, 51B, 51C and 51D, respectively, for storing 'less likely to be updated' word vectors.

Within system architecture 1000, processor chips 1A, 1B, 1C and 1D also include chip-to-chip interconnect interfaces 61A, 61B, 61C and 61D, respectively. These chip-to-chip interconnect interfaces 61A, 61B, 61C and 61D couple inter-process communication channels 41A, 41B, 41C and 41D, respectively, to the external chip-to-chip interconnect 2, thereby enabling communication between the processing chips 1A-1D. Note that chip-to-chip interconnect structure 2 is be connected to a system processor 1001, which controls the operations performed by the various processing chips 1A-1D. Note that the system processor 1001 can also be used in connection with the systems described above in connection with FIGS. 5 and 6.

The word vectors are partitioned into a 'likely to be updated' group of word vectors and a 'less likely to be updated' group of word vectors in the manner described above in the single chip embodiment of FIG. 6. However, the 'less likely to be updated' group of word vectors is further partitioned into four distinct sets of 'less likely to be updated' word vectors, wherein each of these four sets is stored in a corresponding one of the four DRAM memory blocks 51A-51D. That is, one quarter of the 'less likely to be updated' word vectors is stored in each of the four DRAM memory blocks 51A-51D.

The 'likely to be updated' group of word vectors is stored in the on-chip memory 11A, 11B, 11C and 11D of each of the processor chips 1A-1D in the manner described above (i.e., each of the processor chips 1A-1D stores all of the 'likely to be updated' group of word vectors in its corresponding memory blocks $M_0$-$M_N$). In accordance with one embodiment, all of the 'likely to be updated' word vectors are given the same on-chip memory address mapping on each of the processor chips 1A-1D, thereby simplifying the synchronizing of word vector updates across multiple processor chips 1A-1D. For example, the word vector associated with the word 'apple' may be stored at the same address in each of the on-chip memories 11A-11D (e.g., at address A1 within the allocated memory block $M_0$).

Figure 11:
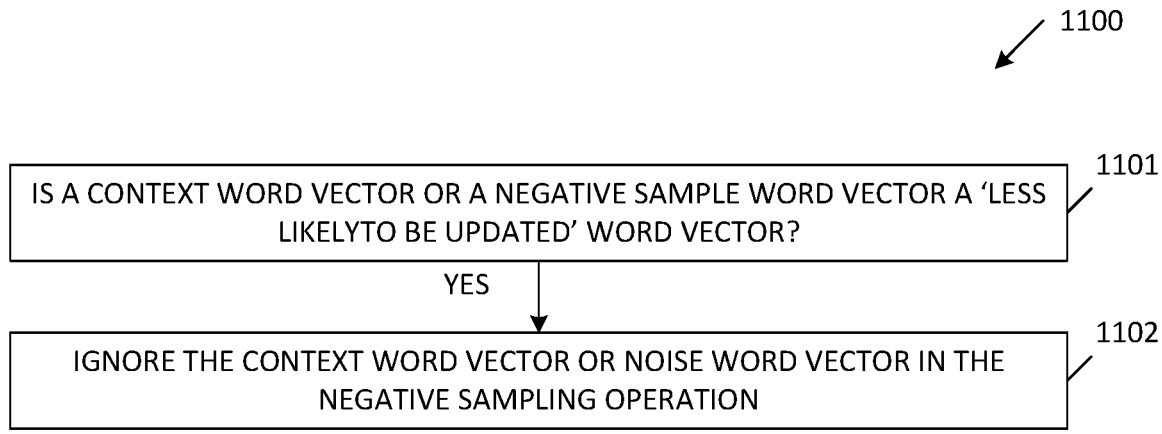
FIG. 11 is a block diagram illustrating a difference between a training operation of the single chip system architecture of FIG. 6 and the multi-chip system architecture of FIG. 10 in accordance with one embodiment of the present invention.

Each of the processor chips 1A-1D independently executes negative sampling operations as described above in connection with the single chip embodiment of FIG. 6, with one important difference, which is described below. FIG. 11 is a block diagram 1100 illustrating this difference between the single chip system architecture 600 of FIG. 6 and the multi-chip system architecture 1000 of FIG. 10.

If a "less likely to be updated" word vector is determined to be a context word vector or a negative sample word vector for a negative sampling operation (FIG. 11, Step 1101), then the contribution of this 'less likely to be updated' word vector to the negative sampling operation is ignored (FIG. 11, Step 1102). For example, if the context word $C_1$ is included in the "less likely to be updated" group of word vectors, then the associated context word vector $C_1$ is not retrieved from DRAM, the dot product of $IW \cdot C_1 = scalar_1$ is not performed, the input word update vector IWUV is not incremented by adding the update vector $C_1 \times scalar_1$, and the context word vector $C_1$ is not updated. Similarly, if the negative sample word vector $N_{11}$ is included in the "less likely to be updated" group of word vectors, then the negative sample word vector $N_{11}$ is not retrieved from DRAM, the dot product of $IW \cdot N_{11} = scalar_{11}$ is not performed, the input word update vector IWUV is not incremented by adding the update vector $N_{11} \times scalar_{11}$, and the negative sample word vector $N_{11}$ is not updated. Ignoring the 'less likely to be updated' word vectors as context word vectors and negative sample word vectors in this manner will advantageously minimize (i.e., eliminate most of) the chip-to-chip communication requirements, while resulting in only a minimal loss of accuracy in the negative sampling operations.

Note that if a 'less likely to be updated' word vector is determined to correspond with an input word for a negative sampling operation, then the associated 'less likely to be updated' word vector is not ignored. In this case, the 'less likely to be updated' word vector is retrieved from the appropriate one of the DRAMs 3A-3D, and the negative sampling operation proceeds in the manner described above.

Figure 12:
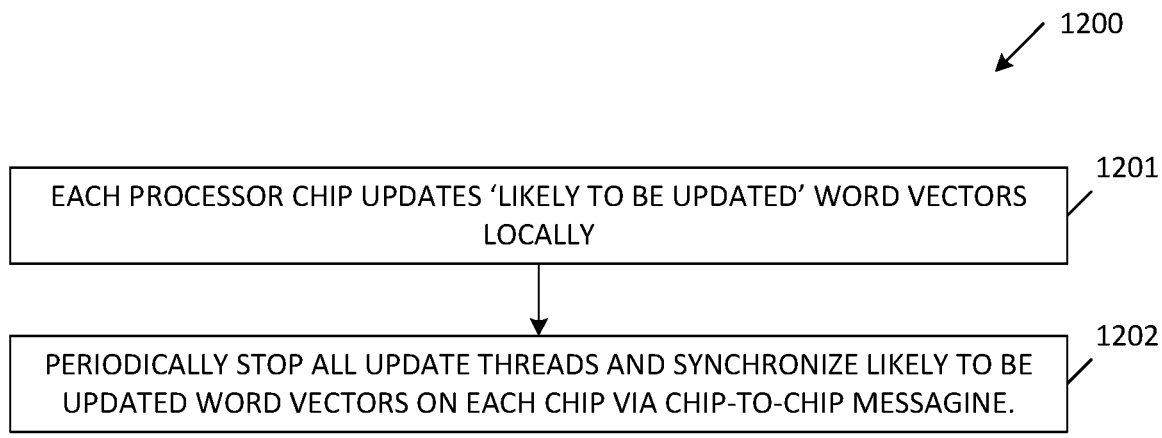
FIG. 12 is a block diagram that illustrates the manner in which processor chips of the multi-chip system architecture of FIG. 10 perform negative sampling operations in accordance with one embodiment of the present invention.

FIG. 12 is a block diagram 1200 that illustrates the manner in which processor chips 1A-1D perform negative sampling operations in accordance with one embodiment of the present invention. In accordance with the described embodiment, each of the processor chips 1A-1D updates its 'likely to be updated' word vectors privately (locally) in order to avoid any chip-to-chip communications for these operations (FIG. 12, Step 1201). Periodically, all the update threads on all of the processor chips 1A-1D are stopped (after all pending negative sampling operations are complete), and the 'likely to be updated' word vectors on each processor chip are resynchronized by exchanging messages via the chip-to-chip interconnect structure 2 (FIG. 12, step 1202). When this resynchronization is complete, each of the processor chips 1A-1D again stores the same identical set of the 'likely to updated' word vectors.

Each of the processor chips 1A-1D will access the 'less likely to be updated' word vectors (for 'less likely to be updated' word vectors not stored in its own corresponding DRAM 3A-3D) by sending a request message to the processor chip that owns the 'less likely to be updated' word vector via the chip-to-chip interconnect structure 2. Note that such request messages are only issued for input word vectors (i.e., these request messages are only issued when an input word vector to be processed by a first one of the processor chips is a 'less likely to be updated' word vector stored in a DRAM of another one of the processor chips). The processor chip receiving the request message may grant access rights and transmit the 'less likely to be updated' word vector to the requesting processor chip. The processor chip that receives the 'less likely to be updated' word vector in this manner will send the updates for this 'less likely to be updated' word vector to the processor chip that owns the 'less likely to be updated' word vector, wherein the processor chip that owns the 'less likely to be updated' word vector is responsible for updating the 'less likely to be updated' word vector in its corresponding DRAM.

For example, assume that processor chip 1A receives an instruction to perform a negative sampling operation for an input word ($IW_1$) having an input word vector ($IW_1$) that is stored in 'less likely to be updated' memory block 51D of DRAM 3D (which is 'owned' by corresponding processor chip 1D). In this case, processor chip 1A sends a request message to processor chip 1D (via chip-to-chip interconnect 2), requesting the 'less likely to be updated' word vector ($IW_1$). In response, processor chip 1D retrieves the requested word vector ($IW_1$) from memory block 51D of DRAM 3D, and transmits the requested word vector ($IW_1$) to processor chip 1A (via chip-to-chip interconnect 2). Processor chip 1A then performs a negative sampling operation in response to the received word vector ($IW_1$) in the manner described above, thereby generating an updated word vector ($IW_{1UP}$). Upon completing this operation, the processor chip 1A transmits a message to processor chip 1D, wherein this message includes the updated input word vector ($IW_{1UP}$). In response, processor chip 1D subsequently updates the 'less likely to be updated' word vector in DRAM block 51D. Note that processor chip 1D performs this update in a manner consistent with that described above in connection with FIG. 6, such that update atomicity is maintained and the multiple writer problem is avoided. In one embodiment, processor chip 1D only grants access to the 'less likely to be updated' word vector $IW_1$ to one requesting entity at a time.

In an alternate embodiment, the processor 1000 assigns negative sampling operations associated with a 'less likely to be updated' input word vector directly to the processor chip that owns the 'less likely to be updated' input word vector. Thus, in the example provided above, processor 1000 would initially determine that the 'less likely to be updated' input word vector $IW_1$ is 'owned' by processor chip 1D, and then assign the negative sampling operations associated with this input word vector $IW_1$ to processor chip 1D (in order to avoid any chip-to-chip communications for these negative sampling operations).

The performance of system architecture 1000 advantageously scales linearly with the number of processor chips 1A-1D.

Although the invention has been described in connection with several embodiments, it is understood that this invention is not limited to the embodiments disclosed, but is capable of various modifications, which would be apparent to a person skilled in the art. Accordingly, the present invention is limited only by the following claims.

We claim:

1. A method of performing negative sampling operations using a processor chip and an external memory, the method comprising:
   partitioning a plurality of word vectors into a 'likely to be updated' group of word vectors and a 'less likely to be updated' group of word vectors, based on a distribution of a plurality of words in a corpus;
   storing the 'likely to be updated' group of word vectors in a plurality of memory blocks on the processor chip;
   storing the 'less likely to be updated' group of word vectors in a first external memory block, external to the processor chip;

storing a plurality of negative samples in a second external memory block, external to the processor chip, wherein each of the negative samples specifies a word in the corpus;
using a refresh thread of the processing chip to retrieve subsets of the negative samples from the second external memory block, and store the retrieved negative samples in a noise sample cache on the processor chip; and
retrieving negative samples from the noise sample cache to perform negative sampling operations on the processing chip.

2. The method of claim 1, further comprising:
receiving a training instruction with the processor chip, wherein the training instruction specifies an input word and a plurality of context words for a negative sampling operation;
using a training thread on the processor chip to retrieve a plurality of negative samples from the noise sample cache for each of the plurality of context words;
using the training thread to obtain access rights to an input word vector associated with the input word, context word vectors associated with the context words, and negative sample word vectors associated with the negative samples, wherein the access rights are obtained from update threads on the processor chip;
using the training thread to calculate dot products of the input word vector and each of the context word vectors;
using the training thread to calculate dot products of the input word vector and each of the negative sample word vectors;
using the training thread to generate an input word update vector using the calculated dot products.

3. The method of claim 2, further comprising:
transmitting a message from the training thread to an update thread associated with the input word, indicating that the input word update vector is available;
using the update thread associated with the input word to retrieve the input word update vector from the training thread;
using the update thread associated with the input word to update the input word vector using the input word update vector.

4. The method of claim 3, wherein the update thread associated with the input word updates the input word vector by adding the input word update vector to the input word vector.

5. The method of claim 2, further comprising:
transmitting a message from the training thread to an update thread associated with a first one of the context word vectors, wherein the message includes a first dot product calculated using the input word vector and the first one of the context word vectors; and
using the update thread associated with the first one of the context word vectors to update the first one of the context words using the first dot product.

6. The method of claim 2, further comprising:
transmitting messages from the training thread to update threads associated with the plurality of context words, wherein each of the messages includes a scalar value that is a dot product of the input word vector and one of the plurality of context word vectors; and
using the update threads associated with the plurality of context words to update the context word vectors associated with the plurality of context words, using the scalar values.

7. The method of claim 2, further comprising:
transmitting a message from the training thread to an update thread associated with a first one of the negative sample vectors, wherein the message includes a first dot product calculated using the input word vector and the first one of the negative sample vectors; and
using the update thread associated with the first one of the negative samples to update the first one of the negative samples using the first dot product.

8. The method of claim 2, further comprising:
transmitting messages from the training thread to update threads associated with the plurality of negative samples, wherein each of the messages includes a scalar value that is a dot product of the input word vector and one of the plurality of negative sample word vectors; and
using the update threads associated with the plurality of negative samples to update the negative sample word vectors associated with the plurality of negative samples, using the scalar values.

9. The method of claim 1, further comprising storing a subset of the 'less likely to be updated' group of word vectors in a memory block on the processor chip.

10. The method of claim 1, further comprising implementing a plurality of update threads on the processor chip, wherein each of the update threads is assigned to a corresponding one of the plurality of memory blocks, wherein each update thread controls updating the 'likely to be updated' group of word vectors in the corresponding one of the plurality of memory blocks.

11. The method of claim 9, further comprising implementing an update thread on the processor chip, wherein the update thread is assigned to the memory block, wherein the update thread controls updating of the 'less likely to be updated' group of word vectors in the memory block.

12. The method of claim 1, further comprising:
receiving a training instruction with the processor chip, wherein the training instruction specifies an input word and a plurality of context words for a negative sampling operation;
determining that one of the context word vectors is included in the 'less likely to be updated' group of word vectors, and in response, ignoring the one of the context word vectors in a subsequently performed negative sampling operation.

13. The method of claim 1, further comprising:
receiving a training instruction with the processor chip, wherein the training instruction specifies an input word and a plurality of context words for a negative sampling operation;
using a training thread on the processor chip to retrieve a plurality of negative samples from the noise sample cache for each of the plurality of context words;
determining that one of the negative samples corresponds with a negative sample word vector included in the 'less likely to be updated' group of word vectors, and in response, ignoring the one of the negative samples in a subsequently performed negative sampling operation.

14. A computer system for performing negative sampling comprising:
a processor chip comprising a plurality of on-chip memory banks, a plurality of on-chip compute engines and a memory interface, wherein the plurality of on-chip memory banks includes a plurality of memory blocks that store corresponding sets of 'likely to be updated' word vectors, a memory block that stores a subset of 'less likely to be updated' word vectors and a noise sample cache that stores a subset of negative samples; and an external memory coupled to the memory interface of the processor chip, wherein the external memory stores a set of 'less likely to be updated' word vectors and a set of negative samples, wherein the plurality of on-chip compute engines includes a refresh thread, which accesses the set of negative samples in the external memory to provide the subset of negative samples stored in the noise sample cache on the processor chip.

15. The computer system of claim 14, wherein the compute engines further include a first plurality of update threads, wherein each of the first plurality of update threads controls the updating of word vectors in a corresponding one of the memory blocks that stores 'likely to be updated' word vectors.

16. The computer system of claim 15, wherein the compute engines also include an second update thread that controls the updating of word vectors in the memory block that stores 'less likely to be updated' word vectors.

17. The computer system of claim 16, further wherein the second update thread accesses the set of 'less likely to be updated' word vectors from the external memory to provide the subset of 'less likely to be updated' word vectors stored in the on-chip memory block dedicated to storing the 'less likely to be updated' word vectors.

18. The computer system of claim 17, wherein the compute engines also include a plurality of training threads, which perform computations required to train the 'likely to be updated' word vectors and the 'less likely to be updated' word vectors.

19. The computer system of claim 18, wherein the training threads obtain permission to access the 'likely to be updated' word vectors from the first plurality of update threads, and obtain permission to access the 'less likely to be updated' word vectors from the second update thread.

20. A computer system for performing negative sampling comprising:

a plurality of processor chips, each comprising a plurality of on-chip memory banks, a plurality of on-chip compute engines and a memory interface, wherein the plurality of on-chip memory banks includes a plurality of memory blocks that store corresponding sets of 'likely to be updated' word vectors, a memory block that stores a subset of 'less likely to be updated' word vectors and a noise sample cache that stores a subset of negative samples; and a plurality of external memories, each coupled to the memory interface of a corresponding one of the plurality of processor chips, wherein each of the external memories stores a set of 'less likely to be updated' word vectors and a set of negative samples.

21. The computer system of claim 20, wherein the plurality of memory blocks that store corresponding sets of 'likely to be updated' word vectors on each of the processor chips store the same sets of 'likely to be updated' word vectors.

22. The computer system of claim 20, wherein each of the plurality of external memories stores different sets of 'less likely to be updated' word vectors.

\* \* \* \* \*